US006976659B2

(12) United States Patent  (10) Patent No.: US 6,976,659 B2
Chen  (45) Date of Patent: Dec. 20, 2005

(54) ADJUSTMENT APPARATUS CAPABLE OF REMEMBERING SCREEN VIEWING ANGLE

(75) Inventor: Tonny Chen, Changhua (TW)

(73) Assignee: E-Lead Electronic Co., Ltd., Changhua (TW)

( * ) Notice: Subject to any disclaimer, the term of this patent is extended or adjusted under 35 U.S.C. 154(b) by 177 days.

(21) Appl. No.: 10/748,268

(22) Filed: Dec. 31, 2003

(65) Prior Publication Data

US 2005/0139735 A1    Jun. 30, 2005

(51) Int. Cl.[7] ............... F16M 13/00; H04N 5/64
(52) U.S. Cl. .................. 248/125.2; 248/284.1; 248/921; 348/837; 296/37.7
(58) Field of Search .............. 248/125.2, 292.12, 248/921, 917, 284.1; 348/837; 296/37.7; 353/13; 361/683, 681

(56) References Cited

U.S. PATENT DOCUMENTS

| | | | | |
|---|---|---|---|---|
| 3,689,695 A | * | 9/1972 | Rosenfield et al. | 348/148 |
| 5,941,488 A | * | 8/1999 | Rosen | 248/278.1 |
| 5,946,055 A | * | 8/1999 | Rosen | 348/837 |
| 6,079,683 A | * | 6/2000 | Lin | 248/292.12 |
| 6,124,902 A | * | 9/2000 | Rosen | 348/837 |
| 6,157,418 A | * | 12/2000 | Rosen | 348/837 |
| 6,181,387 B1 | * | 1/2001 | Rosen | 348/837 |
| 6,246,449 B1 | * | 6/2001 | Rosen | 348/837 |
| 6,292,236 B1 | * | 9/2001 | Rosen | 348/837 |
| 6,354,552 B1 | * | 3/2002 | Chiu | 248/422 |
| 6,644,611 B1 | * | 11/2003 | Tai | 248/292.13 |
| 6,731,350 B2 | * | 5/2004 | Endo et al. | 348/837 |
| 6,754,070 B2 | * | 6/2004 | Chen | 361/683 |
| 6,796,540 B1 | * | 9/2004 | Manceor | 248/284.1 |
| 2004/0032543 A1 | * | 2/2004 | Chang | 348/837 |
| 2005/0035252 A1 | * | 2/2005 | Chen | 248/284.1 |

* cited by examiner

Primary Examiner—Anita M. King
(74) Attorney, Agent, or Firm—Troxell Law Office, PLLC

(57) ABSTRACT

An adjustment apparatus capable of remembering screen viewing angle mainly includes an adjustment device on a device body that equips with a screen. The adjustment device includes a body for housing a screw bar and an adjustment wheel. The adjustment wheel may be adjusted and turned by hands to drive the screw bar to extend forwards or retract rearwards so that the bucking position of the head end of the screw bar against the action zone of the lid may be changed thereby to control the swinging angle of the lid, and adjust and remember the viewing angle.

9 Claims, 7 Drawing Sheets

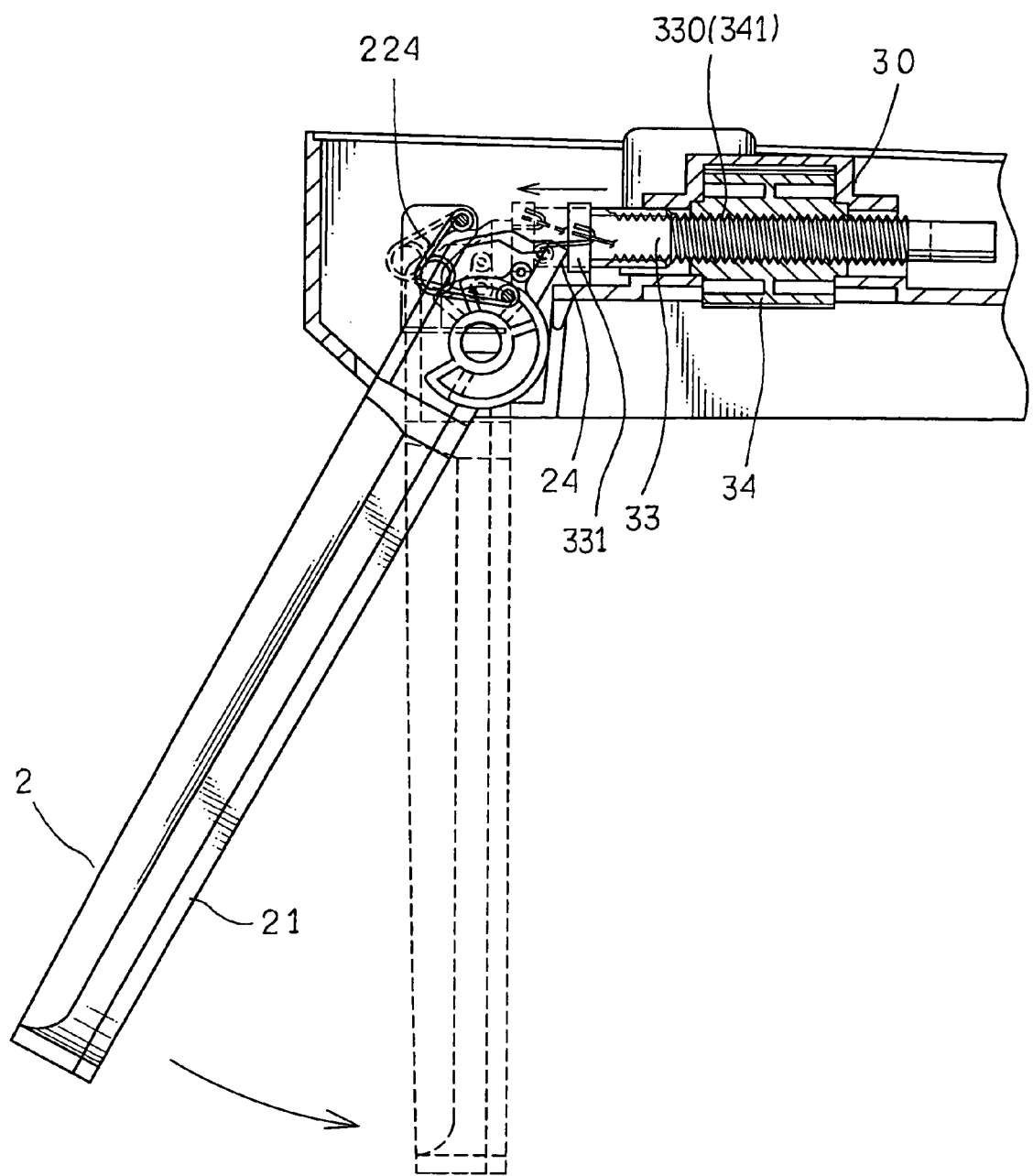
F I G. 7

ADJUSTMENT APPARATUS CAPABLE OF REMEMBERING SCREEN VIEWING ANGLE

BACKGROUND OF THE INVENTION

1. Field of the Invention

The invention relates to an adjustment apparatus capable of remembering screen viewing angle that may be operated by hands to adjust and remember the viewing angle.

2. Description of the Prior Art

Nowadays installing a multimedia playing system in the car as a basic feature has become a new trend. Adjustment of the screen viewing angle of the video audio system now available on the market mostly can be divided into manual adjusting type and electric adjusting type. The manual adjusting type is cheap. But it requires a lot of adjustments to reach the desired visual angle before each viewing. Its operation is inconvenient and affects driving safety. The electric adjusting type is more accurate than the manual type, but it is more expensive. Those two types also have a common drawback, namely once the screen is retracted and stored, the screen viewing angle has to be reset and adjusted again when the screen is unfolded for viewing next time. This becomes an annoying problem.

SUMMARY OF THE INVENTION

In view of the aforesaid disadvantages and the expensive price of the electric adjustment apparatus, the object of present invention is to provide an adjustment apparatus that is capable of remembering screen viewing angle and may be operated by hands to adjust and remember the viewing angle, thereby to resolve the problem of redoing the adjustment every time the screen is unfolded that occurs to the conventional techniques. The invention also aims to overcome the expensive concern occurred to the electric adjustment apparatus.

In order to achieve the foregoing objects, the adjustment apparatus capable of remembering screen viewing angle according to the invention mainly includes an adjustment device located on a device body that equips with a screen. The adjustment device has a body which houses a screw bar and an adjustment wheel. The adjustment wheel may be adjusted and turned by hands to drive the screw bar to extend forwards or retracted rearwards, thereby to change the bucking location of the head end of the screw bar and the action zone of a lid to control the swinging angle of the lid, consequently the viewing angle may be adjusted as desired for viewing.

The device body of the adjustment apparatus according to the invention includes a first bracing dock and a second bracing dock located on one end thereof corresponding to each other. They are pivotally coupled with a first pivot seat and a second pivot seat of a lid to become the turning axis of the lid.

The foregoing, as well as additional objects, features and advantages of the invention will be more readily apparent from the following detailed description, which proceeds with reference to the accompanying drawings.

BRIEF DESCRIPTION OF THE DRAWINGS

FIG. 7 is a schematic view of the invention with the screen viewing angle in an adjusting condition.

DESCRIPTION OF THE PREFERRED EMBODIMENT

Figure 1:
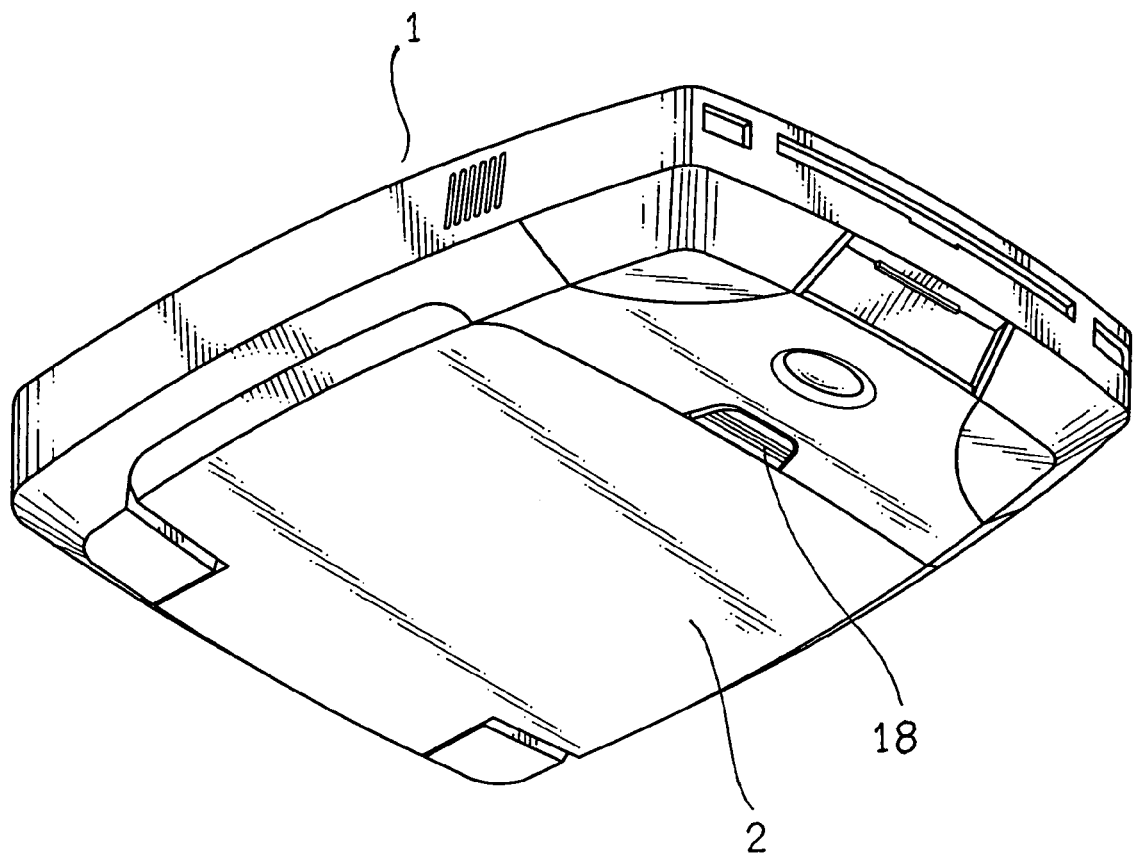
FIG. 1 is a perspective view of the invention.
Figure 2:
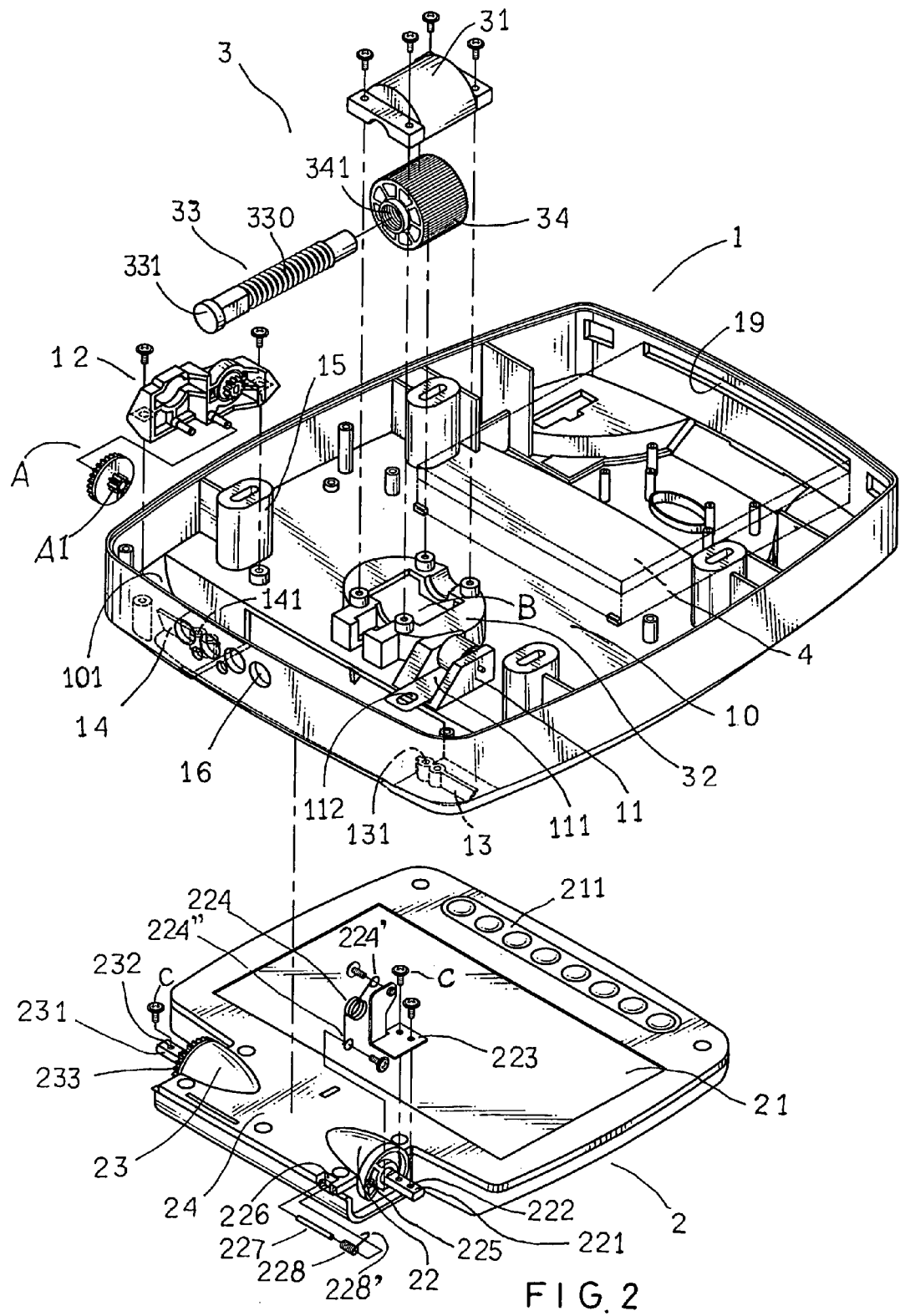
FIG. 2 is an exploded view of the invention.
Figure 3:
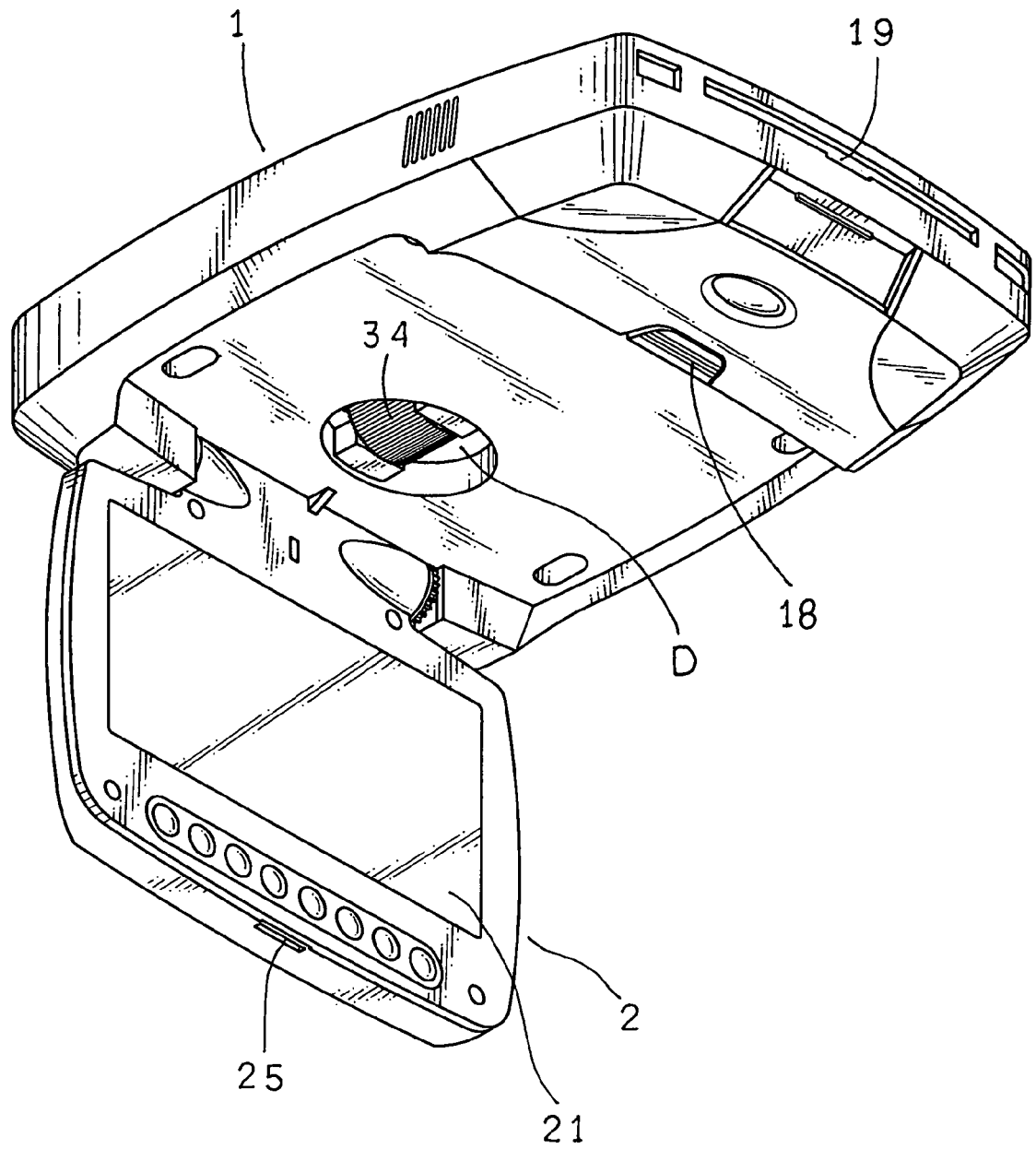
FIG. 3 is a perspective view of an embodiment of the invention.
Figure 4:
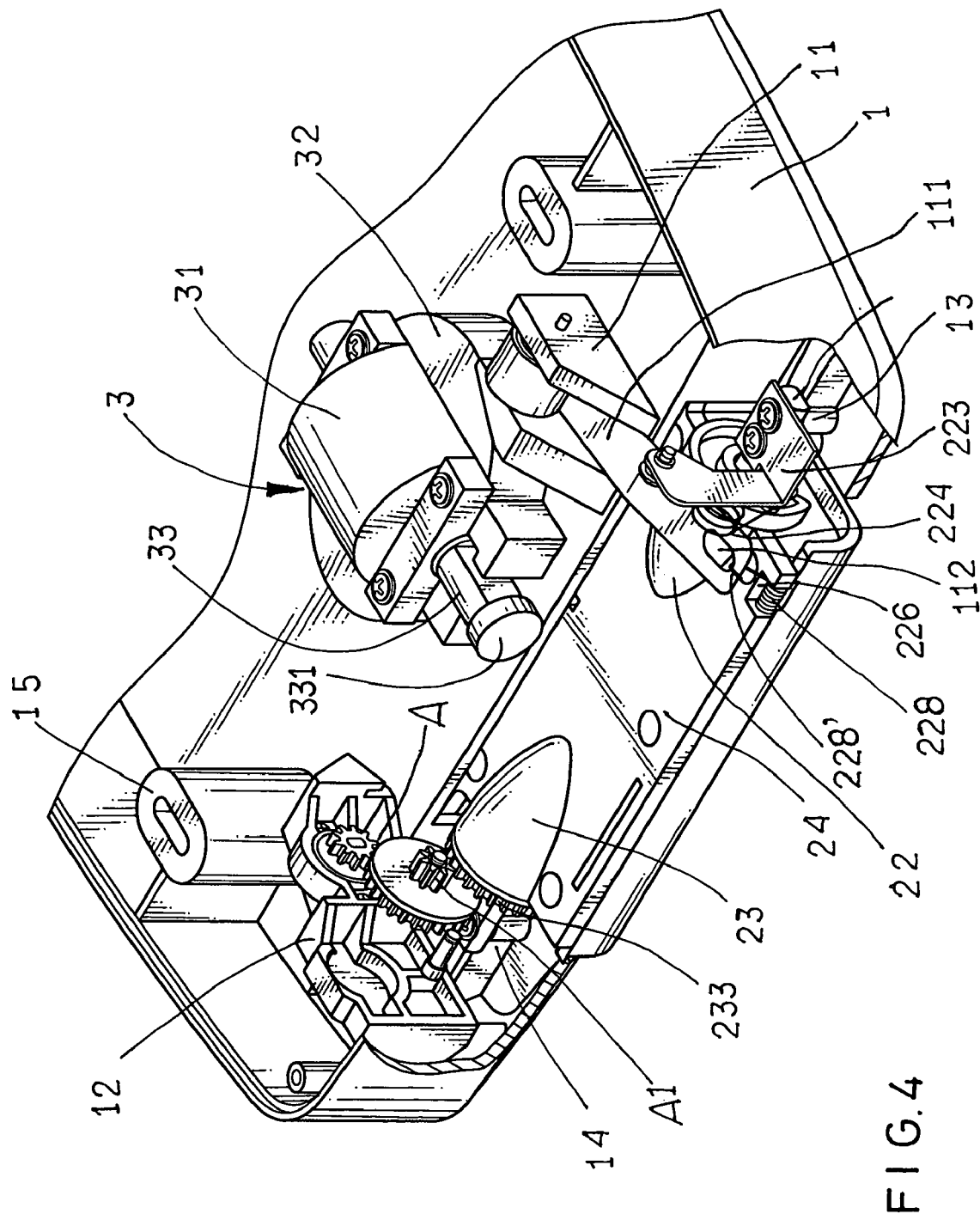
FIG. 4 is a fragmentary perspective view of the adjustment device of the invention.

Referring to FIGS. 1 through 4, the invention includes a device body 1 which is pivotally coupled with a lid 2 that has a screen 21 located thereon. There is an adjustment device 3 located on the device body 1.

The device body 1 has a housing compartment 10 on the top section for holding the adjustment device 3, and a transverse opening 101 on one end to receive one end of the lid 2. There are a first bracing dock 11 and a second bracing dock 12 on the device body close to two sides of the transverse opening 101 that correspond to each other for pivotally engaging with the lid. The first bracing dock 11 is coupled with a spring reed 111 which has a distal end forming an aperture 112. The second bracing dock 12 is coupled with a gear set A. On another side of the transverse opening 101 at two ends there are anchor seats 13 and 14 each has a strut 131 and 141 that have respectively a cavity formed thereon. The device body 1 further has a plurality of fastening struts 15 to couple with bolts (not shown in the drawings) for fastening the device body 1 to a vehicle body. On another side of the device body 1, there are a plurality of video and audio jacks 16 to output or input signals. The device body 1 also has a control button 18 at the bottom section to drive a latch tongue 17 to control closing and latching of the lid 2. The device body 1 further has an adjustment window D corresponding to the adjustment device 3.

The lid 2 is a plate holding a screen 21 on an inner side, and has a button set 211 located on the periphery thereof. It also has a first pivot seat 22 and a second pivot seat 23 on one side that correspond to each other. The area between the first pivot seat 22 and the second pivot seat 23 is an action zone 24 for bucking the adjustment device 3. The first pivot seat 22 has a first shaft 221 with a screw hole 222 formed thereon to fasten to a retaining plate 223 on the anchor seat 13 through a bolt C. The retaining plate 223 has one side fastened to a leg end 224' of a torsional spring 224. The torsional spring 224 has another leg end 224" fastened to a screw hole 225 formed on the first pivot seat 22. There is a notch 226 close to one side of the first pivot seat 22 to pivotally couple with an axle 227. The axle 227 is coupled with an elastic element 228. The elastic element 228 has a leg hook 228' coupling with the aperture 112 of the spring reed 111. The second pivot seat 23 is coupled with a second shaft 231 which has a screw hole 232 to couple with a bolt C for fastening to the anchor seat 14. The second pivot seat 23 further is coupled with a spindle gear 233 on the periphery to engage with a pinion A1 of the gear set A. The lid 2 has a coupling trough 25 at the front side.

The adjustment device 3 has a body 30 which consists of an upper lid 31 and a base 32 that form a housing space B to communicate with the adjustment window D of the device body 1. The housing space B houses a screw bar 33 and an adjustment wheel 34. The screw bar 33 has an external thread section 330 formed on a middle portion and a head end 331 on one end thereof to buck against the action zone 24 of the lid 2. The adjustment wheel 34 has internal screw threads 341 to engage with the external thread section 330 of the screw bar 33.

The housing compartment 10 of the device body 1 further can hold a video audio player 4. The device body 1 has a window 19 at the front side to allow a disk tray to extend outwards (not shown in the drawings).

Figure 5:
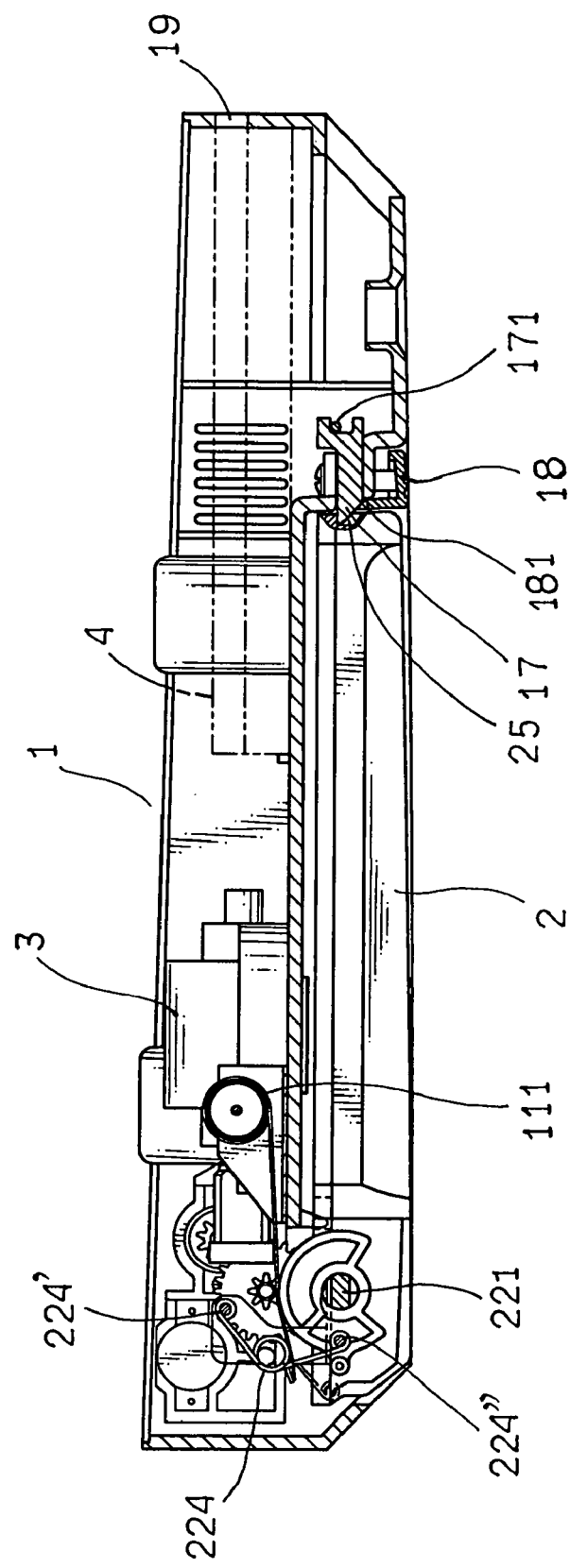
FIG. 5 is a sectional view of the invention in a coupled condition.
Figure 6:
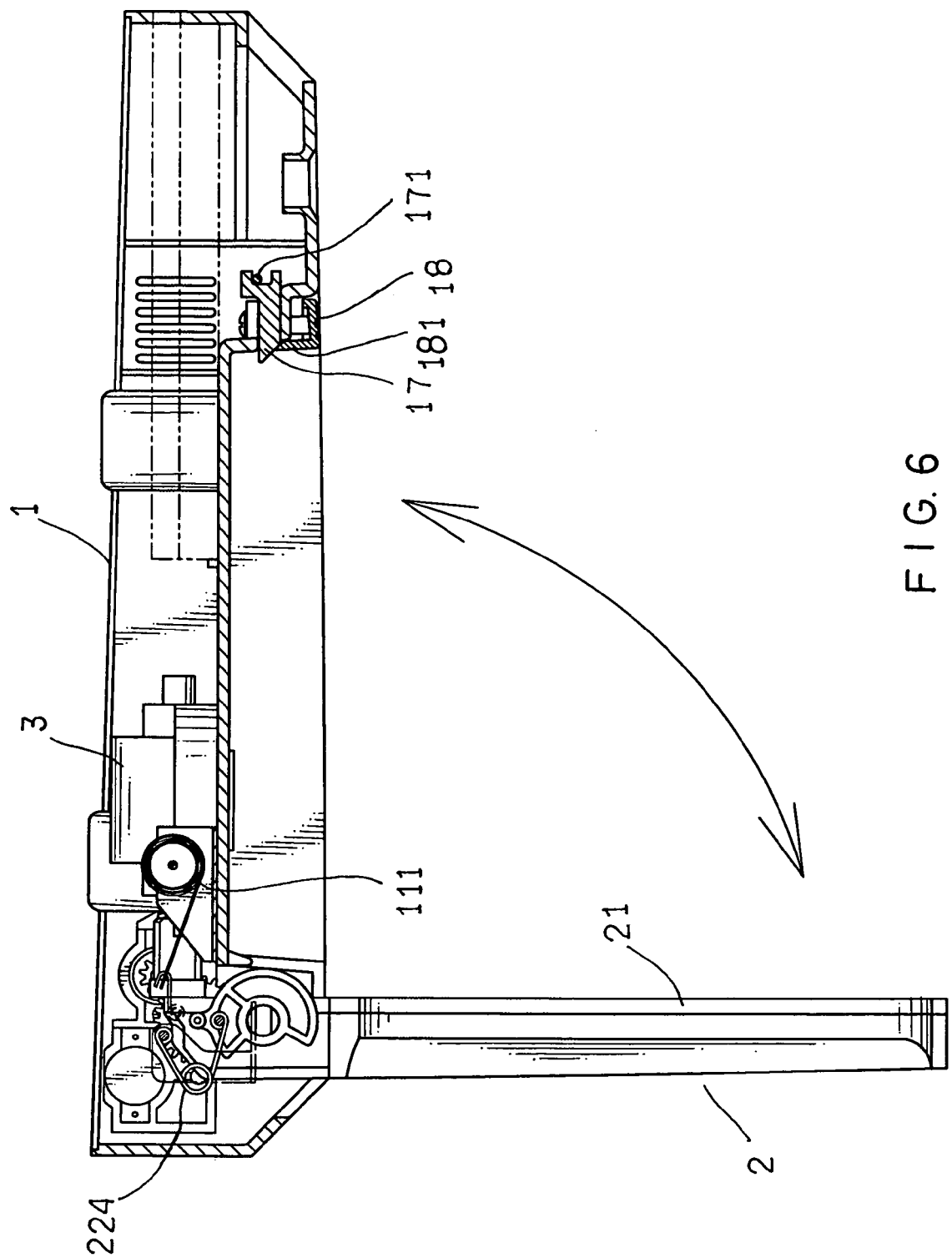
FIG. 6 is a sectional view of the invention in an open condition.

Referring to FIG. 5, when an user want to see the programs in a video disk, first, he/she depresses a biased rib 181 formed on one side of the control button 18 by hands to push the latch tongue 17 away from the coupling trough 25 to form an unlatch condition. The lid 2 is driven by the returning elastic force of the spring reed 111 and the torsional spring 224 to flip to an anchor position (as shown in FIG. 6). If the user thinks the viewing angle is not desirable, he/she turns the adjustment wheel 34 by hands to drive the screw bar 33 to extend forwards or retract rearwards. The head end 331 of the screw bar 33 bucks the action zone 24 of the lid 2 to control the swinging angle of the lid 2 (as shown in FIG. 7). When the lid is closed, and opened again next time, the bucking position of the screw bar 33 and the action zone 24 of the lid 2 remains unchanged. Thus the previous swinging angle is remembered and maintained. Users do not have to redo adjustment for the viewing angle. The lid 2 may be closed by pushing directly. As the latch tongue 17 is extended outwards by the compression of a torsional spring 171 in normal conditions, it may be latched in the coupling trough 25 to anchor the lid 2 to complete the closing operation.

I claim:

1. An adjustment apparatus having memory of a screen viewing angle, comprising:
   a device body having an adjustment device located thereon, and
   a lid pivotally coupled on one side of the device body having a screen located thereon;
   wherein the adjustment device includes a body which houses a screw bar and an adjustment wheel for driving the screw bar to extend forwards or retract rearwards such that bucking position of a head end of the screw bar against an action zone of the lid changes thereby to control a swinging angle of the lid to adjust and remember the viewing angle upon opening and closing lid.

2. The adjustment apparatus of claim 1, wherein the device body has a first bracing dock and a second bracing dock located on one end thereof corresponding to each other for pivotally engaging with a first pivot seat and a second pivot seat located on the lid to form a turning axis of the lid.

3. The adjustment apparatus of claim 2, wherein the first bracing dock is coupled with a spring reed.

4. The adjustment apparatus of claim 2, wherein the second bracing dock is coupled with a gear set which has a pinion to engage with a spindle gear located on the periphery of the second pivot seat.

5. The adjustment apparatus of claim 1, wherein the device body further includes a control button which has a biased rib on one side to push a latch tongue to latch in a coupling trough formed on a front side of the lid for anchoring the lid in a closed condition.

6. The adjustment apparatus of claim 1, wherein the device body has an adjustment window corresponding to the adjustment device.

7. The adjustment apparatus of claim 1, wherein the screw bar has an external thread section and a head end on one end thereof for bucking the action zone of the lid, the adjustment wheel having an internal screw thread to couple with the screw bar.

8. The adjustment apparatus of claim 1 further having a plurality of video and audio jacks to output or input signals.

9. The adjustment apparatus of claim 1 further including a video audio player for displaying pictures on the screen.

* * * * *